US012017848B1

(12) United States Patent
Parker et al.

(10) Patent No.: US 12,017,848 B1
(45) Date of Patent: Jun. 25, 2024

(54) PROTECTIVE REFUSE CONTAINER

(71) Applicants: Lauren Rantzow Parker, Bartlett, TN (US); Alan Judson Cochet, Oxford, MS (US)

(72) Inventors: Lauren Rantzow Parker, Bartlett, TN (US); Alan Judson Cochet, Oxford, MS (US)

( * ) Notice: Subject to any disclaimer, the term of this patent is extended or adjusted under 35 U.S.C. 154(b) by 358 days.

(21) Appl. No.: 16/240,696

(22) Filed: Jan. 4, 2019

Related U.S. Application Data

(60) Provisional application No. 62/718,394, filed on Aug. 14, 2018, provisional application No. 62/613,421, filed on Jan. 4, 2018.

(51) Int. Cl.
*B65F 1/16* (2006.01)
*B65F 1/06* (2006.01)
*B65F 1/14* (2006.01)

(52) U.S. Cl.
CPC .............. *B65F 1/1431* (2013.01); *B65F 1/06* (2013.01); *B65F 1/16* (2013.01); *B65F 2210/148* (2013.01)

(58) Field of Classification Search
CPC .. B65F 1/06; B65F 1/16; B65F 1/1431; B65F 1/10; B65F 2210/148; B65F 2240/145
USPC .......... 220/495.06; 109/46, 66; 232/43.2, 47
See application file for complete search history.

(56) References Cited

U.S. PATENT DOCUMENTS

| | | | | |
|---|---|---|---|---|
| 1,160,820 A * | 11/1915 | Baur | B65F 1/10 | 232/43.2 |
| 4,212,407 A * | 7/1980 | Lydon | B65F 1/1607 | 220/88.1 |
| 5,082,171 A * | 1/1992 | Homel | E05G 7/001 | 232/43.1 |
| 2017/0029209 A1* | 2/2017 | Smith | B65F 1/1615 | |

* cited by examiner

*Primary Examiner* — Don M Anderson
*Assistant Examiner* — Elizabeth J Volz
(74) *Attorney, Agent, or Firm* — William S. Parks

(57) ABSTRACT

Provided herein is a disclosure of a refuse container including a typical plastic refuse bag article therein that is inaccessible without opening the container itself. Such a refuse container is provided with a locked door component that leads to a removable inner receptacle with a top-placed cover sleeve. Such an inner receptacle slides into place under above-extended structures that under which the cover sleeve is positioned, the above-extended structures including an opening that leads to the positioned sleeve with a like-shaped opening therein. Additionally, the refuse container includes an outer opening along a side portion thereof that leads to a curved ramp itself leading to the opening aligned with the cover sleeve and inner receptacle. With this overall design, a plastic bag and cannot be removed without sliding the inner receptacle with the locked door opened.

5 Claims, 6 Drawing Sheets

PROTECTIVE REFUSE CONTAINER

CROSS-REFERENCE TO RELATED APPLICATIONS

This application claims the priority of U.S. Provisional Pat Appl. Nos. 62/613,421, filed on Jan. 4, 2018, and 62/718,394, filed on Aug. 14, 2018, the entireties of both applications being hereby incorporated by reference.

FIELD OF THE INVENTION

This disclosure pertains to a refuse container including a typical plastic refuse bag article therein that is inaccessible without opening the container itself. Such a refuse container is provided with a locked door component that leads to a removable inner receptacle with a top-placed cover sleeve. Such an inner receptacle slides into place under above-extended structures under which the cover sleeve is positioned, the above-extended structures including an opening that leads to the positioned sleeve with a like-shaped opening therein. Additionally, the refuse container includes an outer opening along a side portion thereof that leads to a curved ramp itself leading to the opening aligned with the cover sleeve and inner receptacle. With this overall design, the locked door prevents any access, the curved ramp prevents a person reaching within the internal portion of the refuse container, and the cover sleeve covers the plastic bag and cannot be removed without sliding the inner receptacle with the locked door opened. Thus, there is no external accessibility to such a plastic bag, thereby allowing desirable utilization of such a plastic article for cleanliness purposes without any chance of removal thereof from such a refuse container without first unlocking the door. The method of operation and use of such a structure and device is encompassed herein as well.

BACKGROUND OF THE INVENTION

Dangers persist in certain institutions, particularly those pertaining to individuals suffering from mental illness and/or incarcerated prisoners, in relation to potential suicide or harm to others. Such persons are constantly monitored to prevent self-harm, at least, through the utilization of different articles and tools. As is well documented, for instance, the ability of an individual to choke or hang themselves through a belt, bedsheet, and/or other type of rope-like structure, is a constant issue that has forced such institutions to implement protocols to remove such potential dangerous items from access points available to such patients. This has certainly created difficulties in terms of such constant monitoring as well as removing particular articles that may be helpful rather than solely dangerous. Added to this list recently have been plastic garbage bags. Such articles provide highly effective means of disposing of a variety of different types of refuse, from dry solids to wet solids and liquids, but have proven to be simultaneously a potential hazard with certain types of individuals. The ability of such plastic bags to properly and effectively retain such solids and liquids (ostensibly to protect such individuals and medical professionals and staff from contamination and/or infection) is well known, certainly. However, the potential for such bags to be reached, manipulated, utilized for different types of hazardous activities (as noted above, for instance, hanging, choking, tying of a person's hands, etc.) has created this distinct problem within such institutions. Thus, although such plastic refuse bags are particularly useful, safe, and desirable for cleanliness purposes (particularly in terms of effectiveness at low costs), the potential for such harmful activities to occur due to accessibility by such individuals has led to discontinuation of utilization in certain situations. As a result, there are significant difficulties related to the removal of such garbage bags from utilization within such institutions, particularly in terms of creating other problems with waste disposal in response to protecting patients/prisoners from physical harm. However, due to the well-documented capabilities of mental patients and/or prisoners to access and actually use such bags for destructive if not fatal purposes, certain institutions have, again, taken to removing such plastic bags from internal circulation and utilization for refuse collection and disposal. Thus, such institutions have relied upon more expensive wax-coated articles (which still exhibit similar properties as plastic bags, leading to little to no improvement, particularly if such wax-coated articles are accessible to such patients/prisoners), or, alternatively, complete overhaul of internal refuse disposal with no bags in use, leaving such places susceptible to contamination problems due to solid and liquid waste generation. This has led to potential harmful results in terms of the lack of proper refuse collection and removal, unfortunately, thereby creating, as noted above, other and potentially far worse consequences overall within the target institution. Thus, there is a definitive need to provide a means of allowing for plastic bags for trash collection and disposal within such institutions but also prevent access, beyond question, simultaneously. To date, nothing has been provided by the state of the art to such an end. The present disclosure herein, however, does cover such devices and protocols to prevent such plastic refuse bag access within a specifically designed refuse container, as described below.

ADVANTAGES AND BRIEF SUMMARY OF THE DISCLOSURE

A distinct advantage of the disclosed refuse container is the ability to utilize a flexible plastic trash bag without external access thereto allowing for suitable cleanliness levels without potential for individuals to reach such a bag when in use. Another advantage is the presence and utilization of a ramp component leading to the internal trash bag that includes a curved configuration to prevent capability of individual reach to access such a bag. Yet another advantage is the inclusion of a safe locking device with a door to permit the only access to remove the subject trash bag from within the refuse container as well as a three-dimensional internal removable container with an internal container sleeve with a peripheral lip for placement over the top edge of the internal container to cover the trash bag portion placed over the internal container edge. Still another advantage of this disclosure is the presence of two opposing indentations with flat bottom edges within the confines of the refuse container configured to act as detents in relation to the internal container sleeve to prevent upward movement thereof. Another advantage is the access of the trash bag solely upon unlocking of the door, shifting of the internal container from underneath the opposing indentations, removal of the internal container sleeve, and then removal of the trash bag, thus providing a failsafe structure to prevent unauthorized access thereto.

Accordingly, this invention encompasses a refuse container article with a pathway from an external point through an opening to a final internal refuse depositing location therein, wherein said refuse depositing location is a three-dimensional removable internal container over which may be placed for refuse collection is a flexible plastic refuse bag, wherein said flexible plastic refuse bag cannot be accessed or removed from said refuse container when present over said three-dimensional removable internal container by reaching within said opening from said external point. Further encompassed herein then is such a refuse container article comprising an external housing having a) an opening leading internally within said housing, said opening leading along an inclined and curved ramp having a horizontal bottom edge, and b) a door with a lock device, said refuse container article further comprising said three-dimensional internal removable container having a closed end and a top opening having a peripheral edge and a top positioned and removable sleeve, wherein said sleeve has a tunnel configuration with two opposing openings with a peripheral lip on the top end thereof. Also encompassed herein is the refuse container article as noted above further including an indentation opposing said ramp component and exhibiting a horizontal bottom edge in the same plane as that of said opposing ramp component bottom edge, wherein said bottom edges provide a detent structure to prevent lifting of said internal container sleeve when present within said refuse container. Also encompassed herein is a method of providing and utilizing a flexible plastic trash bag within a refuse container while simultaneously preventing access thereto said bag when present and locked therein, said method including the steps of: providing the refuse container described above; placing a trash bag having a closed end and an opening for refuse placement therein within said three-dimensional removable internal container with said bag top edges draped over the peripheral edge of said internal container, placing said internal sleeve over the draped bag and internal container edges wherein said peripheral lip of said sleeve covering said bag edges and said internal container edges; sliding said internal container with said bag and said sleeve present therein and thereon within the confines of said external housing, wherein said opening of said internal container is situated under said inclined and curved ramp and said bottom edge thereof; locking said door; and placing refuse through said opening of said external housing for manipulation into said bag within said internal container; wherein said bag cannot be removed from said refuse container unless said door is unlocked, said internal container is removed therefrom, and said sleeve is removed from said internal container. Also encompassed herein is a sleeve component as a structure having a) a top end with a limited opening aligned with the ramp of the housing opening and large enough to allow for refuse to pass through when placed within said housing opening and traveling along said ramp such that the remainder of said top end of said sleeve is closed, b) an opposing bottom open end, and c) at least one wall (creating a cylindrical structure, with as many as four wall creating a squared or rectangularly shaped cylinder) leading from said bottom open end to said top limited opening end, wherein said sleeve component is configured for insertion within the internal removable container and within a flexible refuse bag simultaneously, and wherein said sleeve further includes at least two opposing internal ramp structures as inclined plates with a wall-attachment portion and an edge, wherein said ramp structures lead downward toward said bottom closed end but not touching the opposing wall portion thereof, wherein said first internal ramp is located below said sleeve component top end opening and is attached to said at least one wall in one location thereon, and wherein said at least one second internal ramp is located below said first ramp structure and any refuse traveling downward from said first ramp will land on said at least one second ramp structure and travel downward toward said bottom closed end thereof. Such an alternative sleeve type allows for potentially greater protections from external access of the bag secured underneath the sleeve top edge(s) and surrounding the inserted component as well. The limited opening prevents reaching further within the internal removable container and the internal ramp structures prevent any further possibility of access to discarded refuse. The inserted component is thus structured to prevent any access to the flexible bag as well since such an insert is the only access to the internal portion of the internal container and thus the bag, too.

With such an overall article and method of use, as noted above, the ability of an individual actually accessing the internal flexible plastic trash bag is prevented without destruction of the external housing itself and movement of the internal container from its location therein. Such a design and configuration thus provides multiple levels of protection regarding access to the flexible plastic trash bag when in use. As noted previously, the ability to utilize such a sanitary flexible plastic trash bag for all kinds of refuse (solid and liquid) allows for safer situations and cleaner facilities. The ability to prevent unwanted access by susceptible individuals to such flexible trash bags within certain institutions (prisons, mental hospitals, etc.) thus allows for continued sanitary refuse protections while assuring the potential for harmful, if not fatal, utilization thereof is alleviated.

Such a refuse container is preferably constructed from metal materials, such as steel, stainless steel, aluminum, brass, and the like, in order to prevent destruction of the external housing, at least (or at least make such destruction highly improbable). As alluded to above, the importance of the overall structure is to prevent external access to a flexible plastic trash bag present within the structure in order to permit such sanitary utilization of such a bag while simultaneously keeping such a bag from being removed without unlocking and removing the internal container itself. In other words, since such flexible plastic trash bags have proven to be a hazard in terms of individuals with suicidal or like tendencies, the ability to still provide such useful articles for sanitary purposes while preventing access to the same in an institutional setting is of utmost importance. The metal materials provided for construction of the external housing (including the locking door, the inclined and curved ramp, and the opposing indentation therein, as well) and at least the internal container sleeve (the internal container may though not necessarily be constructed of plastic or like materials, but preferably is of metal build, as well) provide an initial protective basis against unwanted entry through the resilient structure provided with such strong and difficult to deform constructions. Thus, as prisoners, mental health patients, and the like, do not typically have access to tools that can readily deform and/or destroy such metal materials, the utilization of such metal-based articles accords the protective outer boundary needed to prevent such undesirable internal access.

The external housing thus includes a lockable door component, preferably with a cam lock, or like implement. Such a door is typically hinged and recessed within the wall of the housing to ensure one cannot simply place a thin object between the door and the wall to pry such a door open. The door may be present on the of the housing perpendicular to that of the opening for refuse introduction or, if desired, may be on the opposite side thereof. In such a situation, access to the door may require movement of the overall refuse container in order to permit such door access, but such may also provide further protection due to the placement against a building wall. In such an instance, if desired, the refuse container will not be bolted (or other manner) to a floor, for clear reasons. However, if the door were situated perpendicularly to the refuse introduction opening the refuse container may be bolted (or other manner) to the floor to further provide protective measures by preventing (or at least making it extremely difficult) an individual from lifting/maneuvering/manipulating such an overall refuse container, thereby reducing the chance of deforming/destroying the container to permit access to the bag therein (or, for that matter, using such a heavy container as a weapon to harm him/herself or others). Thus, again, if desired, bolting to the subject floor may be undertaken as long as access to the locked door is provided as well.

The external housing also includes the aforementioned opening for introduction of refuse within the internal cavity in which the internal container with sleeve and trash bag is present. Such an opening is provided in typical fashion, at least at the external point thereof, as a full unobstructed opening or a hinged flap cover opening. For protective purposes, the utilization of a hinged flap cover opening is potentially preferred as such a configuration allows for a limited access possibility but with sufficient space to introduce subject refuse therethrough. Thus, the flap may be positioned to maneuver a certain distance within the internal portion of the external housing, but enough to allow for refuse placement, but not, without damaging the flap itself, enough to allow for one to reach further within the internal cavity of the external housing. In any event, the opening is a cutout within the external housing with, if utilized, a flap hinged from the top edge of the opening for such refuse placement access on demand. The opening continues within the internal portion of the external housing with a bottom edge extending from the inner side of the external housing and an upper incline and curved ramp at the top edge thereof extending as well. In this manner, the incline allows for the refuse introduced within the opening to slide downward into the internal portion of the external housing (and into the bag which is present within the internal container with the sleeve thereover at the edges). The curved portion provides yet another extra protective component to this configuration as the ability for an individual to reach within the opening down the incline and around the curve to the internal container is thwarted sufficiently with at least a 20 degree curve (after an incline of at least 5 degrees downward). The length of the incline prior to the curve is from 10 to 18 inches and the curve leads another 6 to 10 inches thereafter. The bottom edge of the ramp opening is flat and provides an upper detent (obstacle) to any lifting of the internal sleeve covering the bag and internal container edges, as well. There is also within another possible embodiment an opposing indentation provided within the external housing at an incline and with a flat bottom edge in the same plane as that of the opening ramp bottom edge. This indentation provides a dual purpose in that the bottom edge accords further capability of preventing lifting of the internal sleeve when the internal container/sleeve/bag composite is present within the external housing cavity and the door is closed and locked as well as a means to deflect any refuse towards the internal container/sleeve/bag when introduced within the opening itself and allowed to slide down through the inclined and curved portions thereof. Such an opposing indentation is likewise constructed of metal materials (as is the ramp) to accord strength sufficient to prevent lifting of the sleeve against such bottom edges and may be the same materials as in the external housing itself.

With the external housing provided in such a fashion, there is provided further the aforementioned internal container that provides the location for bag placement. Such a container is configured to be any suitable shape to fit within the confines of the cavity within the external housing, whether square, circular, triangular, and the like, with a preferably (though not necessarily) closed bottom (closed would aid were the bag to tear, of course) and an opening at the top. Such an internal container may be plastic or metal or other like material, but preferably metal to accord further strength and protections from undesirable destructive possibilities. The internal container must also be of a height and configuration that fits directly below the ramp bottom edge (and also, if present, the opposing indentation bottom edge) with enough room to allow the sleeve to be placed thereover the peripheral edges of the internal container as well. In this manner, the internal container with sleeve (and bag sandwiched in between) will be situated below the bottom edges of such ramp and possible indentation, from about ½ inch to actual abutment thereof, to prevent upward movement of the internal container as well as removal of the sleeve therefrom from an external position. With the door closed and locked, the only access to the internal portion of the external housing would be through the ramp opening and the configuration of the internal container/sleeve/bag composite aligned with such ramp and possible opposing indentation bottom edges ensures the sleeve will not be removable and the bag cannot be removed (or even touched, for that matter) itself. Thus, the sleeve component is provided in a shape that aligns with that of the internal container opening peripheral edges, potentially with a slightly larger circumference thereof to ensure the sleeve rests atop the internal container and cannot descend or be pushed within the internal container. The sleeve is in essence a tunnel-shaped implement with a bottom end having a circumference (or just shape, for that matter) that is slightly smaller than that of the internal container. Such a measurement allows for the sleeve to be placed within the confines of the internal container cavity but along the edges of the sides thereof to allow for maximum area and volume for refuse introduction within the internal container cavity as covered with the subject flexible plastic trash bag. In this manner, the peripheral edges sit atop the internal container and the remainder of the sleeve extend within the internal container to provide, along with the bottom edges of the ramp opening and the possible opposing indentation, a manner of prevent removal of the sleeve itself when situated in such a position. The sleeve should be manufactured from sufficiently strong metal materials to prevent damage if an individual were to possibly be able to reach within the ramp opening and grab the sleeve seeking access to the subject trash bag. Such materials may be the same as noted above for the external housing, etc.

As noted above, and as a potential alternative to the tunnel configuration of the sleeve component, there may be employed a substantially full-length sleeve component that is inserted within the internal removable container as well as within the confines of the subject flexible bag present therein. In this manner, as the above shorter sleeve example provides a protective means partially within the internal container (and thus the bag itself), this alternative structure allows for substantially full placement of the sleeve component to further prevent any access to the flexible bag as the internal container (with bag and sleeve) is present within the full refuse can. The composite of internal container/flexible bag/internal sleeve slides within the refuse can cavity (through the lockable doorway, as above) and the internal sleeve top abuts the top portion of the refuse can to prevent any upward movement of the sleeve when in position. The limited opening structure of the internal sleeve aligns with the ramp of the refuse can to allow for refuse to slide downward along the ramp and through such an opening into the internal sleeve cavity (and thus within the bag as well). Upon reaching a suitable level for removal from the locked compartment of the refuse can, the door is opened, the internal container is slid out, and the internal sleeve is lifted to allow the refuse to remain within the confines of the flexible bag that can then be removed, as well. In such a configuration, the bag may be tied off to securing means (rings, slits in the internal container wall, and the like, for example) on opposing sides of the internal container (or possible four to allow for full opening of the closed-end flexible bag to facilitate internal sleeve introduction therein). Upon removal, such tied structures are undone to allow for such movement. The internal sleeve (insert) may be secured to the internal container, as well, to further prevent any possible removal through the refuse can opening by grabbing the internal sleeve therethrough. In such a manner, the sleeve will not move from the internal container, thus preventing any access to the flexible bag as a result. Such a connection(s) may be a hook (or hooks), a magnet (or magnets), a slidable lock device, or any other like reliable connection means. Thus, in this alternative manner, the same basic peripheral edges of the internal sleeve as described above may be utilized to prevent access to a bag placed therebelow, but with a further manner of obstructing access to the internal removable container itself. An opening may be introduced within the top side of such a sleeve (with the remainder of the top side thereof completely closed, thus leaving the opening as the sole access point for introduction within the internal container/sleeve composite, as well. Also, the internal sleeve itself may include directing ramps to prevent access to internal refuse from an external location (as a further means to prevent access by a person unless the locked door is undone, for instance). In such a possible configuration, a ramp may lead at a constant angle from the point of ingress within the limited top opening of the sleeve downward for refuse to slide thereon and to prevent one from reaching underneath. At least one other ramp starting at a point lower than the ending point of the first ramp (which extends roughly ½ to ¾ of the distance within the sleeve cavity from the starting point side) and leading in the opposite direction thereto (and preferably, though not necessarily, at the same angle as the first ramp) as well as ½ to ¾ of the distance within the sleeve cavity is present to permit refuse to slide thereon into the bottom portion of the sleeve/flexible bag. This at least one other ramp thus provides even further obstacles to an external person accessing the flexible bag and/or refuse therein when the refuse can is fully closed and locked. The ramp angles may be anywhere from 5 to 40 degrees, preferably from 10 to 35 degrees, and most preferably about 20 to 30 degrees. Again, more ramp structures may be employed if desired, roughly having the same angles, lengths, etc., and located below the second and first ramps and leading in a direction opposite that of the next higher ramp.

The flexible plastic trash bag disclosed herein may be one of any suitable and typical type readily utilized within the refuse collection and disposal industry. Thus, bags of polyethylene, (such as LLDPE or LDPE), polypropylene, nylon, combinations of polymers, the list goes on, may be utilized for such a purpose. The bags should be of suitable size to allow for the peripheral edges thereof to drape over the internal container peripheral edges when the bag is introduced within the cavity of the internal container, as well. In this manner, as noted above, the bag is positioned over the internal container and the sleeve may then be placed over the bag and internal container peripheral edges to prevent access to the bag edges when within the external housing and aligned with the ramp opening and possible opposing indentation bottom edges.

Thus, in terms of the overall method of utilization, a user may unlock the external housing door, remove the three-dimensional (removable) internal container and sleeve, remove the sleeve, place a trash bag over the edges of the internal container, place the sleeve over the bag and internal container edges, place the internal container/bag/sleeve article back within the external housing and slide the same until placed and aligned with the bottom edge of the ramp opening and, if present, the opposing indentation bottom edge, and the close and lock the door. The refuse container may then be utilized as any other trash receptacle with individuals introducing refuse within the external housing opening which leads, by the incline and curved ramp into the internal container/bag/sleeve article for collection therein. When the bag has sufficiently filled, or the user regularly checks and removes the bag with refuse therein, one simply unlocks the door, slides the internal container/bag/sleeve article out of the external housing, removes the sleeve, removes and disposes of the bag, introduces a new bag, places the sleeve as before, slides the internal container/new bag/sleeve article back within the confines of the external housing as before, and closes and locks the door. If the door is on the back (ramp opening opposing) side, the overall refuse container would first be moved from the wall (presumably) and the same actions then taken to place and remove and replace a bag as needed.

If desired, the overall refuse container may include some other safeguards and indicators that may be of help for protection and notification of refuse levels. Such may include a sensor indicating when the height of the collected refuse reaches a certain level. Since the view of the collected refuse will be extremely difficult (if not impossible) with such a structure, the potential for an indicator sensor would facilitate understanding of the need for such removal and replacement, particularly in a manner to prevent waste of too many trash bags themselves. Of course, if certain refuse emanates undesirable aromas, and the like, such may be detected through individual sense means; however, there may be provided an indicator as to smell and even liquid presence, particularly if such properties exceed permissible levels. Likewise, a sensor may be provided to indicate if the internal container is in contact with liquids directly, thus indicating that trash bag has developed a leak and requires handling in that respect. As it concerns unauthorized access, then, there may be provided at least one sensor to notify when the door is unlocked (and only if permitted at a certain time would such a notification be accepted; otherwise, immediate response may be undertaken), if an individual has reached too far within the ramp opening (thus indicating the attempt to reach the bag from the outside), and/or if the sleeve has been contacted when present in alignment with the ramp opening bottom edge, at least. In other words, there are numerous ways to provide further protective and notification means, as noted above, that may be implemented within this inventive overall refuse container, if desired.

BRIEF DESCRIPTION OF THE DRAWINGS

The novel features believed characteristic of the disclosed subject matter will be set forth in any claims that are filed now and/or later. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE DRAWINGS AND PREFERRED EMBODIMENTS

Reference now should be made to the drawings, presented as non-limiting possible embodiments in accordance with the descriptions provided above. The ordinarily skilled artisan would fully understand the breadth and scope intended herein in relation to the following potentially preferred types.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms “a”, “an”, and “the” are intended to include the plural forms as well, unless the context clearly indicates otherwise. It will be further understood that the terms “comprises” and/or “comprising” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
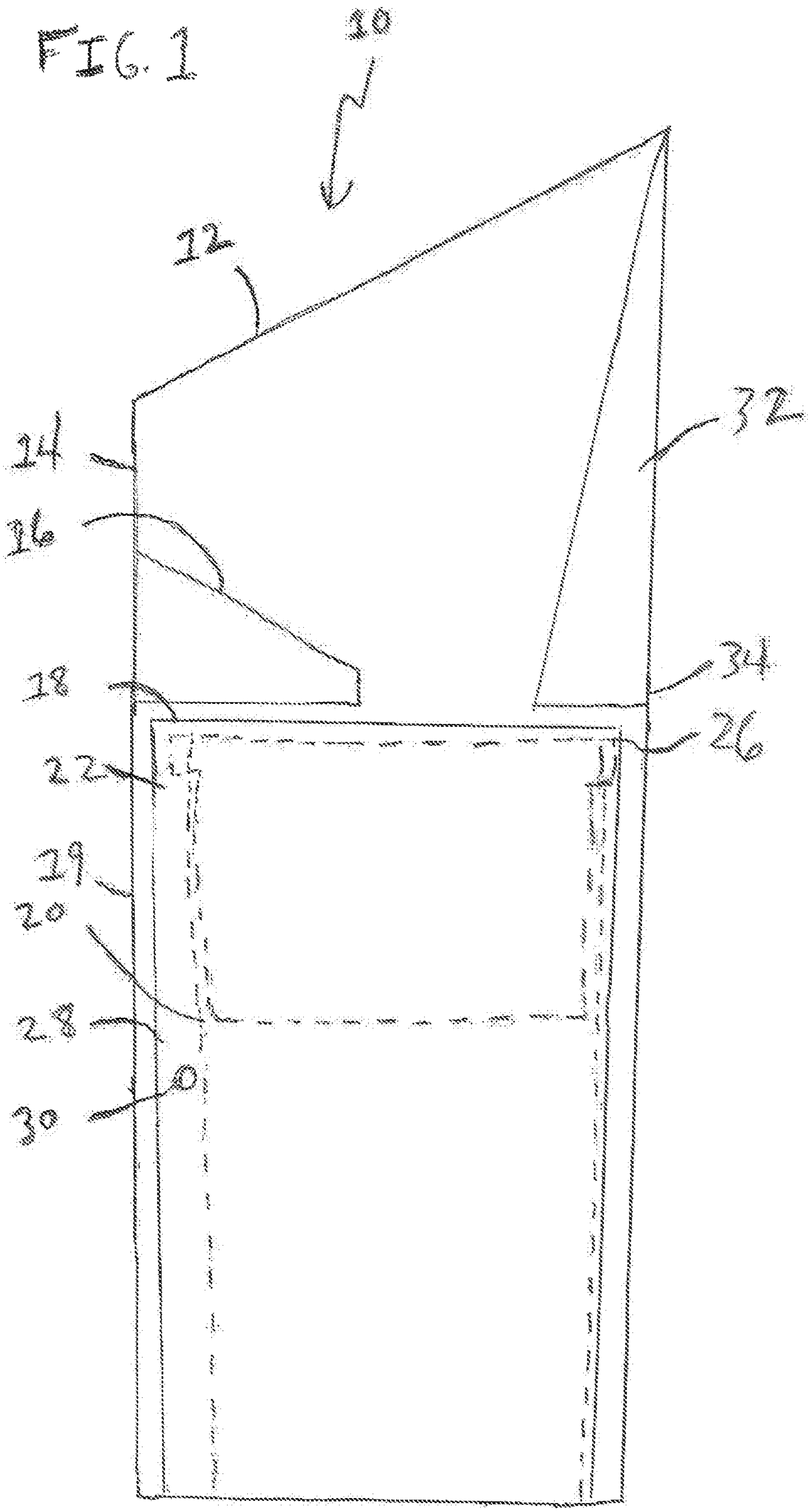
FIG. 1 depicts a side partial cut-away view of the overall external housing and internal container component of the inventive refuse container.
Figure 2:
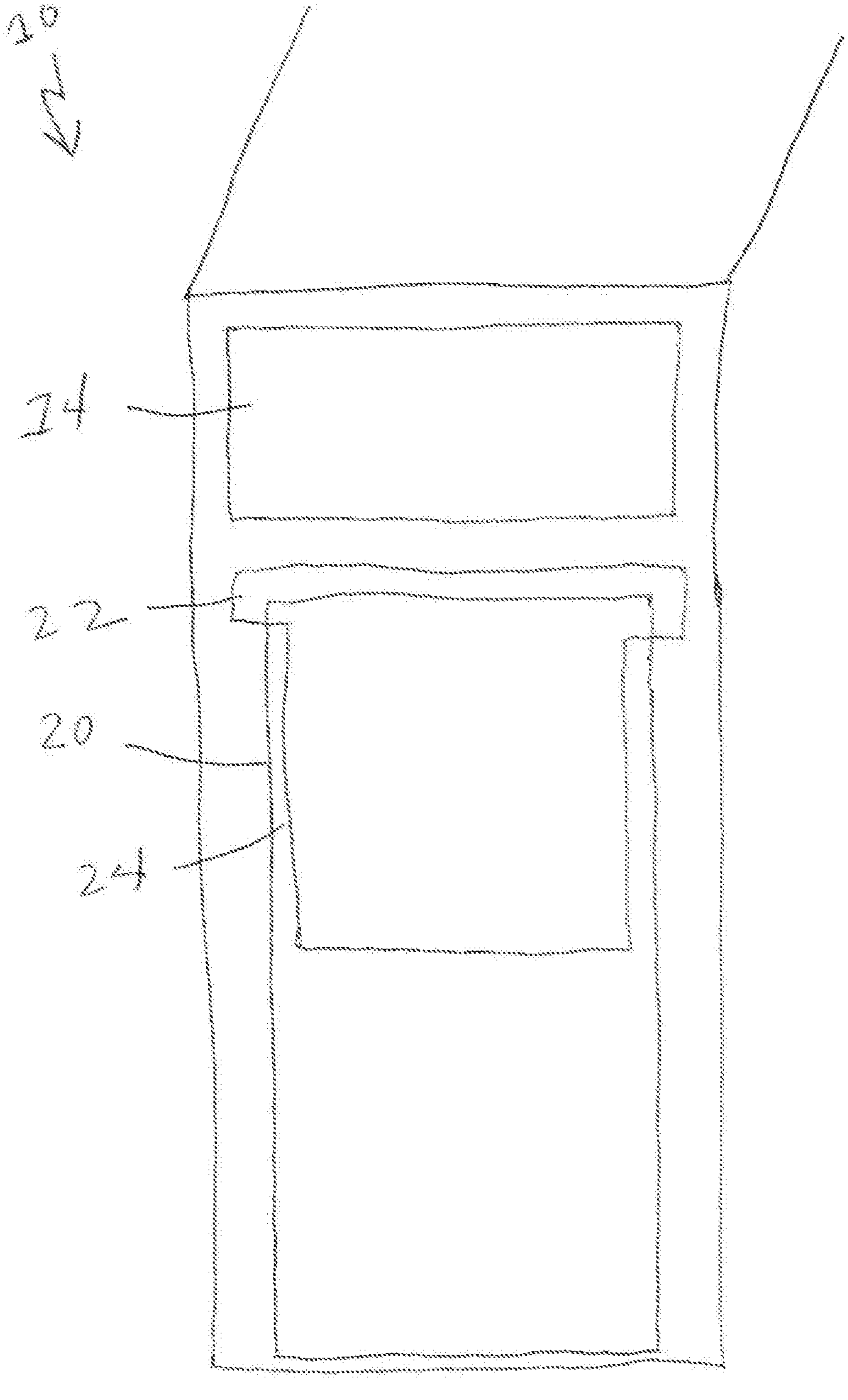
FIG. 2 depicts a front view of the inventive refuse container.

FIG. 1 shows a side view of a potentially preferred embodiment of this disclosure. The overall refuse disposal article 10 includes an external housing 12, an opening 14 with an inclined ramp 16 (which is also curved, as shown with the ramp 166 in FIG. 10), and a flat bottom edge 18 leading to an internal cavity 19 in which an internal container 20 with a sleeve 22 and a flexible plastic trash bag 24 are present. The sleeve 22 has a peripheral edge 26 that is larger than the peripheral edge (36 in FIG. 3) of the internal container 20 to allow for said sleeve 22 to rest thereupon and cover the edges of the bag 24. A door 28 with a lock 30 provides controlled access to the internal cavity 19 and thus the internal container 20 and bag 24. There is also shown here an opposing indentation 32 with a flat bottom edge 34 that is within the same plane as the bottom edge 18 of the ramp 16. Such bottom edges 18, 34 allow for alignment with the top edge of the sleeve 22 in order to prevent access to the bag 24 from the opening 14 and ramp 16. The opposing indentation 32 also provides a manner of deflecting refuse from any area along such a wall to a location other than within the bag 24. FIG. 2 shows the front of the refuse disposal article 10 with the hinged opening 14 within the external housing 12 and the placement of the internal container 20 and sleeve 22 in relation to the bag 24.

Figure 3:
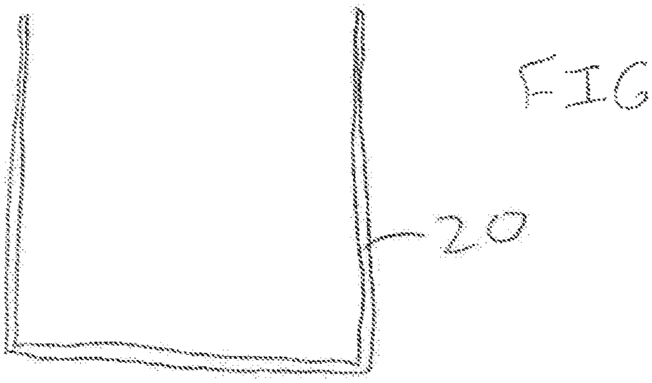
FIG. 3 depicts a side view of the internal container.
Figure 4:
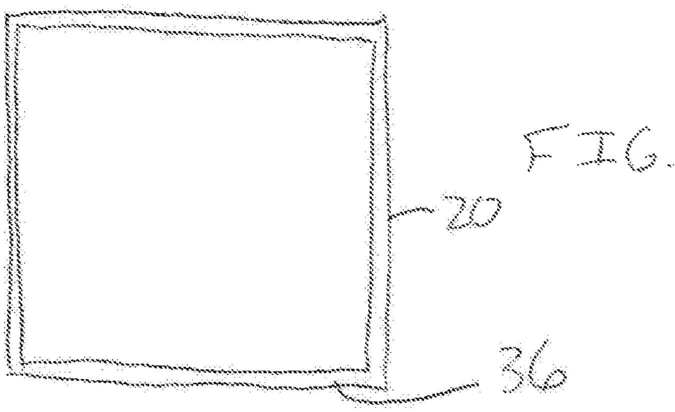
FIG. 4 depicts a side view of the internal sleeve.
Figure 5:
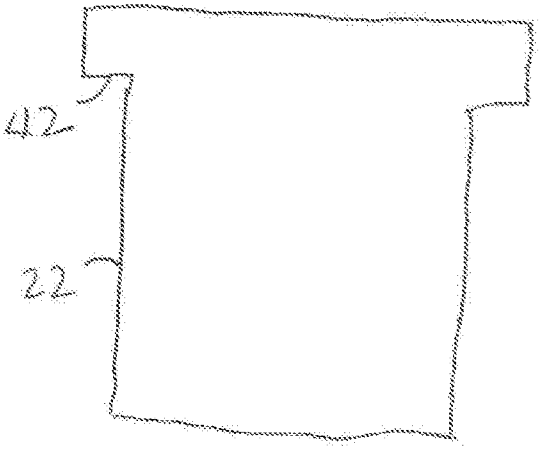
FIG. 5 depicts a top view of the internal container.
Figure 6:
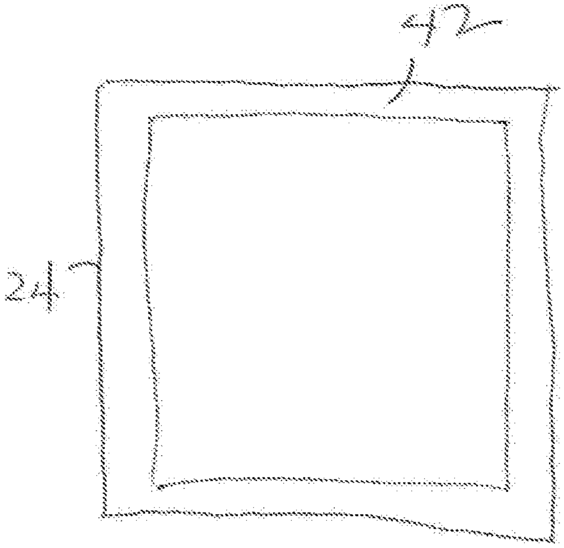
FIG. 6 depicts a top view of the internal sleeve.

FIGS. 3 and 4 provide side and top views of one possible embodiment of the three-dimensional removable internal container 20. Here, the container 20 is of a square-like shape at the top edge 36 and extends downward in the same shape in a three-dimensional closed-end structure. Such a container 20 has a closed bottom 38 in this instance, but may be open if desired. The top edge 36 exhibits a certain circumference (sum of all top edge side lengths) that aligns with the sleeve (22 of FIGS. 5 and 6). In this manner, that sleeve 22 has a top peripheral edge 42 that extends over the top edge 36 of the internal container 20 to permit placement thereover without propensity for such a sleeve 22 to descend or fall within the internal container 20 but rest thereon safely. The sleeve 22 further includes four extending walls 40 that descend within the internal container 20 as far as possible when the two top edges 36, 42 are aligned (and present with a bag therebetween). When introduced with a bag (24 of FIG. 1) sandwiched between the internal container top edge 36 and a sleeve peripheral top edge, the internal container 20 with sleeve 22 and bag 24 provides an article that slides within the internal cavity 19 of the external housing 12 and that closely abuts the bottom edges 18, 34, of the ramp 16 and opposing indentation 32 to prevent access and/or removal of the sleeve 22 and thus bag 24 from an external location, or at least until the door 28 is unlocked and the internal container 20, sleeve 22, and bag 24 are removed therefrom.

Figure 7:
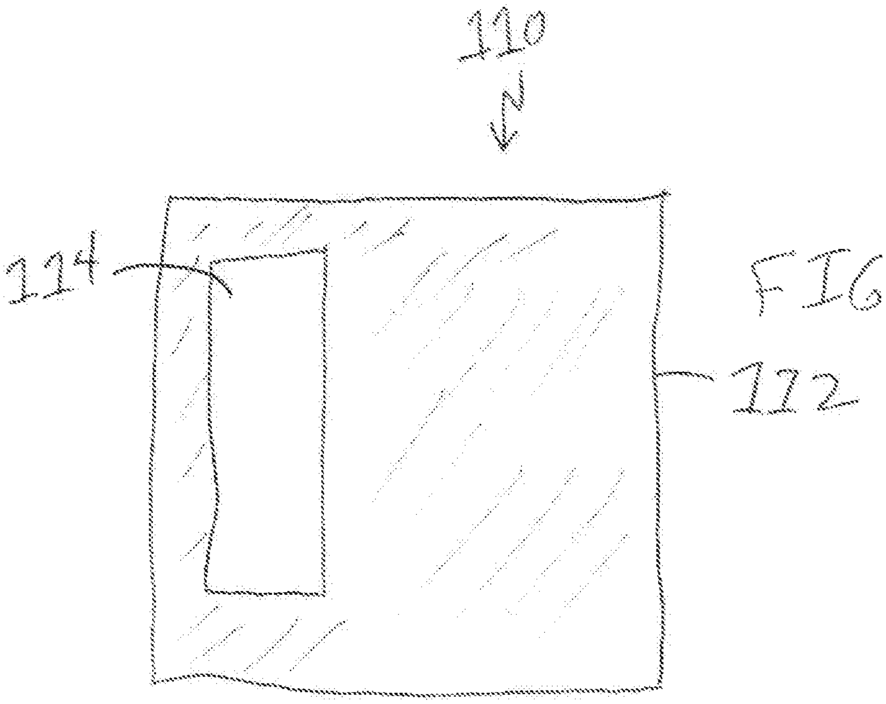
FIG. 7 depicts a top view of an alternative internal sleeve.
Figure 8:
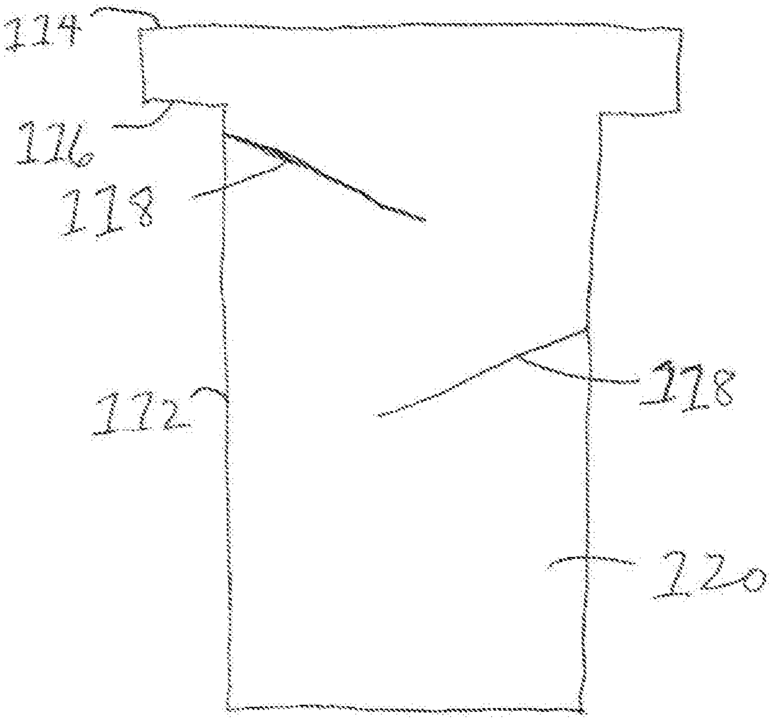
FIG. 8 depicts a side view of the alternative internal sleeve of FIG. 7.
Figure 9:
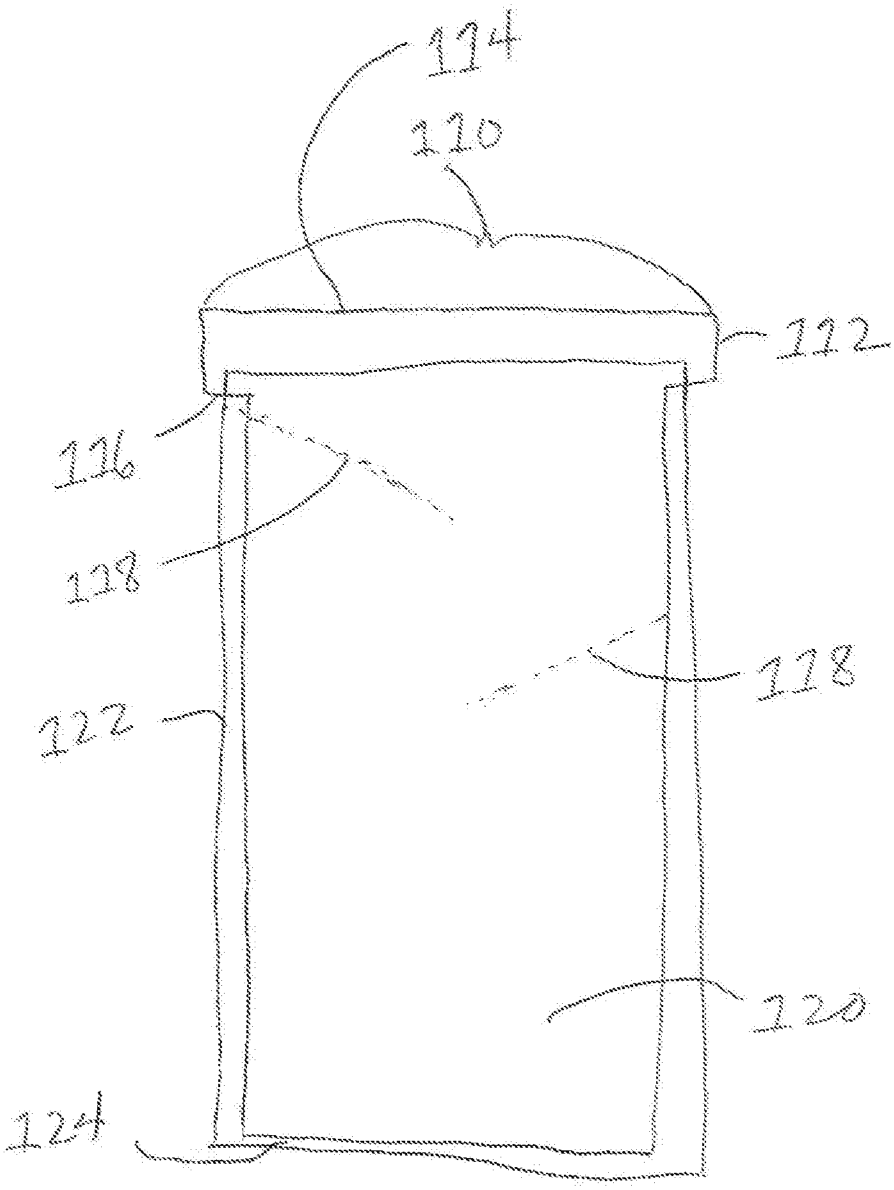
FIG. 9 depicts a side cut-away view of the alternative internal sleeve of FIGS. 7 and 8 as included within the internal container.

FIGS. 7, 8, and 9 provide an alternative sleeve 110 Having a top end 112 with an opening 114 that aligns with that of the refuse can (18 of FIG. 1, for instance). With such a closed end and limited opening top end 112, the sleeve 110 may be provided with a depth similar to that of the internal container (122 of FIG. 9), thereby also substantially matching the depth of the cavity opening of a flexible refuse bag (not illustrated). Such a sleeve 110 is shown at a side view in FIG. 8 with the top opening 114, an underside lip 116 (much like that described above for the shorter type of sleeve) and a bottom end 120 that remains open just as for that described above, as well. Opposing ramps 118 are provided within the sleeve 112 in order to provide refuse direction as well as protection thereof as it resides within the bottom portion 120 from any external reaching, grabbing, etc. As noted above, such an alternative sleeve 110 may be removably attached to the internal container (122 of FIG. 9) as added benefit and strength. FIG. 9 shows the composite 110 of inserted sleeve 112 and internal container 122 with a flexible bag (not illustrated) to be present between both with the sleeve 112 inserted therein and the bag (not illustrated) inserted within the internal container cavity 124. Thus, taking this composite 110, one may utilize such in place of that as shown in FIG. 1 to provide a different, potentially more effective, obstacle to external reaching of the bag and/or refuse therein, while still allowing for a sanitary refuse can to be provided.

Figure 10:
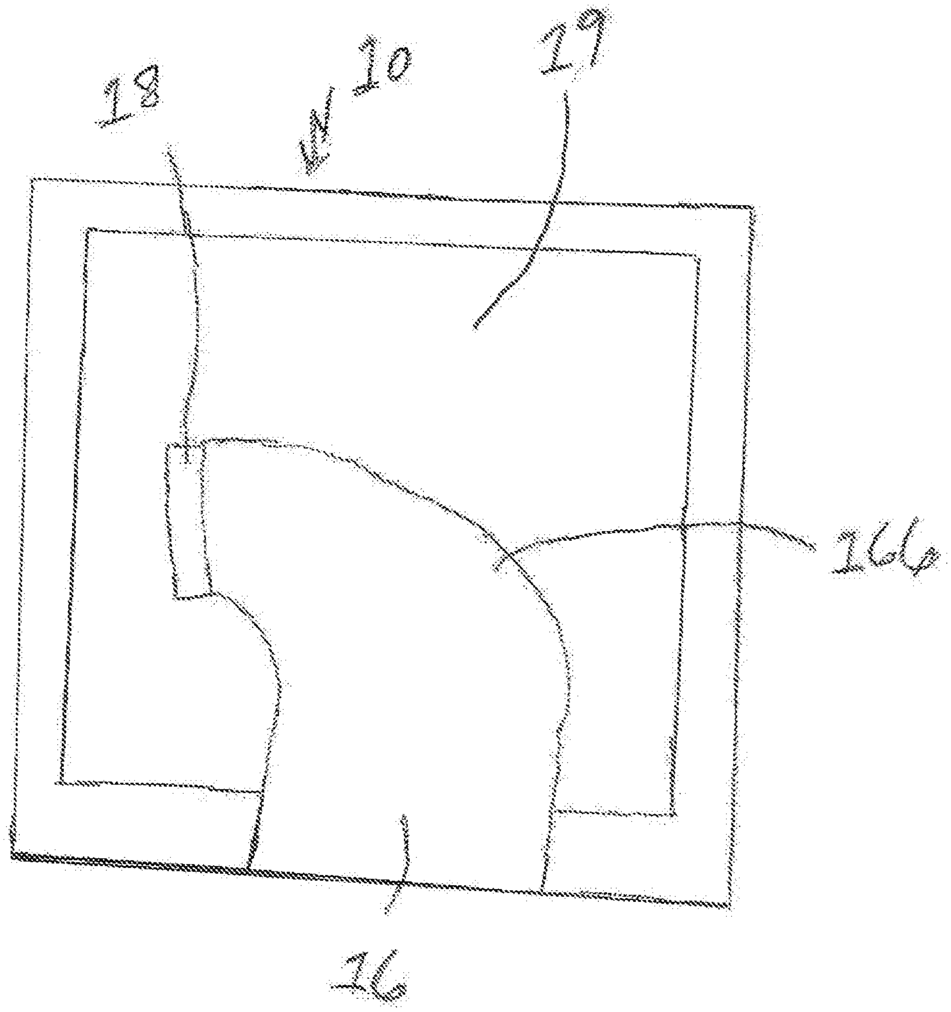
FIG. 10 depicts a top cut-away view of the refuse container of FIG. 1.

FIG. 10 shows a cut away view of the top portion of the refuse container article 10 including the inclined ramp 16 and the curved portion thereof 166 leading downward to a horizontal bottom edge 18 and the internal cavity 19 within which the three-dimensional removable internal container (20 of FIG. 1) and thus the flexible refuse bag (24 of FIG. 1) are present. Such an inclined, curved ramp 16, 166 thus add to the obstacles for external access to the internal container 20, but allows for refuse to move through such a pathway for desired disposal therein.

Thus, a manner of providing a sanitary refuse collection system with a flexible plastic trash bag while also according a manner preventing access to such a trash bag while in use is permitted. Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the description herein cover any and all such applications, modifications, and embodiments within the scope of the present invention.

What we claim is:

1. A refuse container article comprising an external housing including a pathway from an external point through an opening to a final internal refuse depositing location therein, wherein said pathway exhibits an inclined and curved ramp having an initial downward incline followed by a curved downward ramp leading to said final internal refuse depositing location, wherein said final internal refuse depositing location is a three-dimensional removable internal container over which may be placed for refuse collection is a flexible plastic refuse bag, wherein said flexible plastic refuse bag cannot be accessed or removed from said refuse container when present over said three-dimensional removable internal container by reaching within said opening from said external point; wherein said external housing further comprises a) an opening leading internally within said external housing, said opening leading along said inclined and curved ramp having a horizontal bottom edge, b) a door with a lock device, c) said three-dimensional removable internal container having a closed end and a top opening having a peripheral edge, and d) a top positioned and removable sleeve component exhibiting a tunnel configuration with two opposing openings with a peripheral lip on the top end thereof for placement over said internal removable container top opening peripheral edges to ensure said sleeve rests atop said internal container and cannot descend or be pushed within said internal container, and a lower end thereof below said peripheral lip exhibiting a shape that is smaller than that of the shape of said internal container.

2. The article of claim 1 further including an indentation opposing said ramp component and exhibiting a horizontal bottom edge in the same plane as that of said opposing ramp component bottom edge, wherein said bottom edges provide a detent structure to prevent lifting of said internal container sleeve from its position over said internal removable container top opening peripheral edges when present within said refuse container.

3. The refuse container article of claim 1 wherein said inclined and curved ramp exhibits a horizontal bottom edge, and wherein the incline of said inclined and curved ramp of at least 5 degrees from said opening and the curvature of said inclined and curved ramp of at least 20 degrees after said incline.

4. The refuse container article of claim 3 wherein said refuse container article further includes at least two opposing internal ramp structures as inclined plates with a wall-attachment portion and an edge, wherein said ramp structures lead downward toward said bottom closed end but not touching the opposing wall portion thereof, wherein said first internal ramp is located below said sleeve component top end opening and is attached to said at least one wall in one location thereon, and wherein said at least one second internal ramp is located below said first ramp structure and any refuse traveling downward from said first ramp will land on said at least one second ramp structure and travel downward toward said bottom closed end thereof.

5. The refuse container article of claim 4 wherein said sleeve is removably attached to said internal container and said flexible bag is removably attached to said internal container.

* * * * *